F. R. WILSON AND A. O. RINGO.
MOWING MACHINE.
APPLICATION FILED JULY 24, 1918.

1,384,288.

Patented July 12, 1921.
2 SHEETS—SHEET 1.

Witnesses
J. T. L. Wright

Inventors
F. R. Wilson
A. O. Ringo
By Victor J. Evans
Attorney

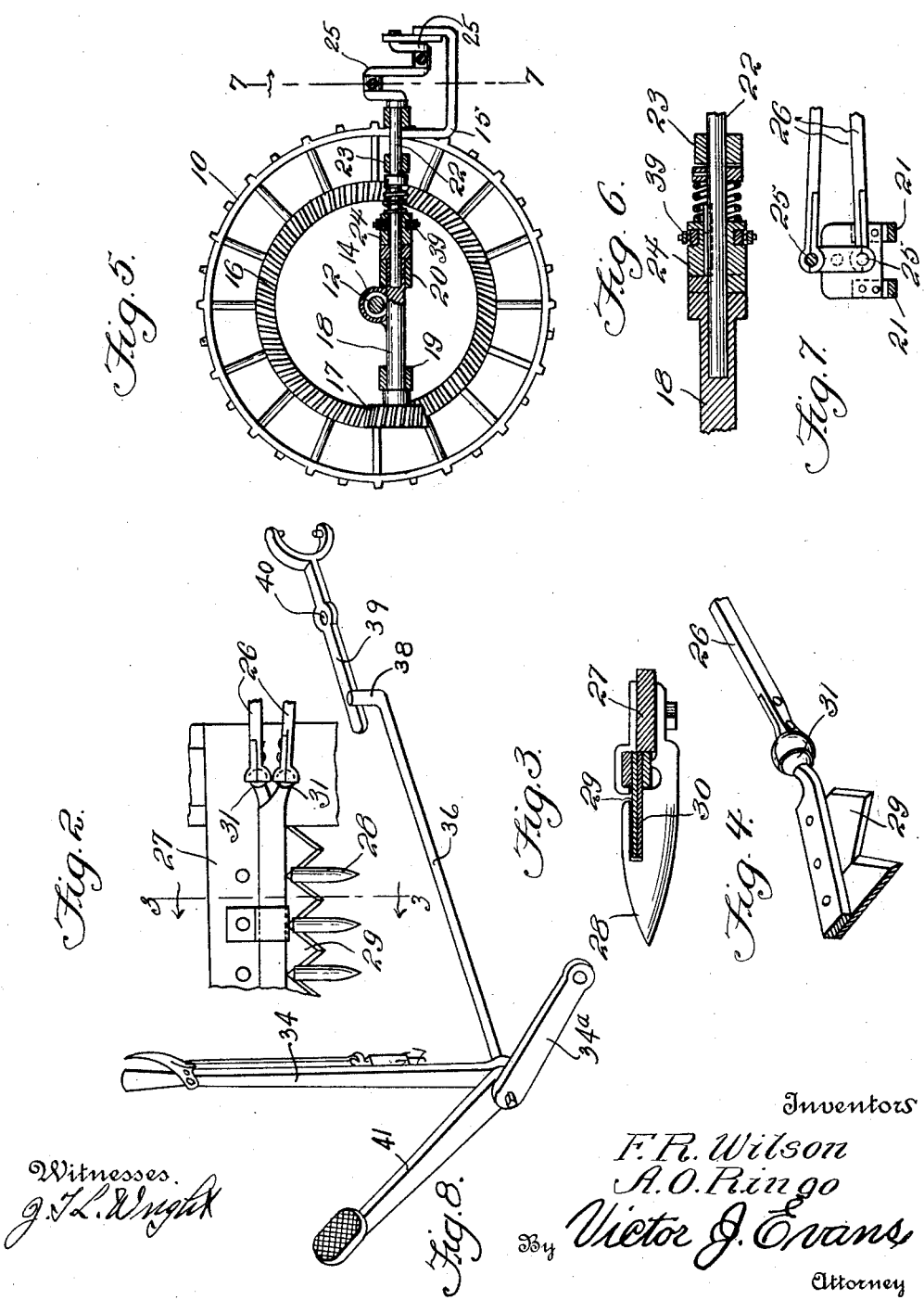

UNITED STATES PATENT OFFICE.

FRANK R. WILSON AND ANDREW O. RINGO, OF WILLISTON, NORTH DAKOTA.

MOWING-MACHINE.

1,384,288.  Specification of Letters Patent.  Patented July 12, 1921.

Application filed July 24, 1918. Serial No. 246,563.

*To all whom it may concern:*

Be it known that we, FRANK R. WILSON and ANDREW O. RINGO, both citizens of the United States, residing at Williston, in the county of Williams and State of North Dakota, have invented new and useful Improvements in Mowing-Machines, of which the following is a specification.

This invention relates to improvements in mowing machines and has for its object to provide a simple and efficient mechanism employing a cutter bar in which is mounted a pair of alternately reciprocating knife bars, permitting of the reduction of speed at which the bars are operated, thereby reducing wear and strain on the mechanism and at the same time increasing the efficiency of the machine.

Another object of the invention is to provide a novel form of supporting frame for supporting and protecting the mechanism which operates the knife bars, the said frame being pivotally mounted to swing beneath the axle and be so arranged as to practically balance itself, the frame being further provided at its forward end with runners, which surround the knife operating cranks to protect the latter from contact with stumps, rocks or clod.

Other objects and advantages of the invention will appear as the following description is read in connection with the accompanying drawings.

In the drawings:—

Fig. 2 is an enlarged fragmentary plan view showing the connection between the knife bars and the pitmen;

Fig. 3 is a transverse sectional view on the line 3—3 of Fig. 2;

Fig. 4 is a fragmentary perspective view of the end of one of the knife bars and the contiguous portion of its pitman;

Fig. 5 is a transverse sectional view on the line 5—5 of Fig. 1;

Fig. 6 is an enlarged section more clearly illustrating the clutch shown in Fig. 5;

Fig. 7 is a detail sectional view on the line 7—7 of Fig. 5;

Fig. 8 is a detail view illustrating the mounting of the control lever and the manner of operating the clutch.

Referring to the drawings in detail, like characters of reference denote corresponding parts throughout the several views.

Figure 1:
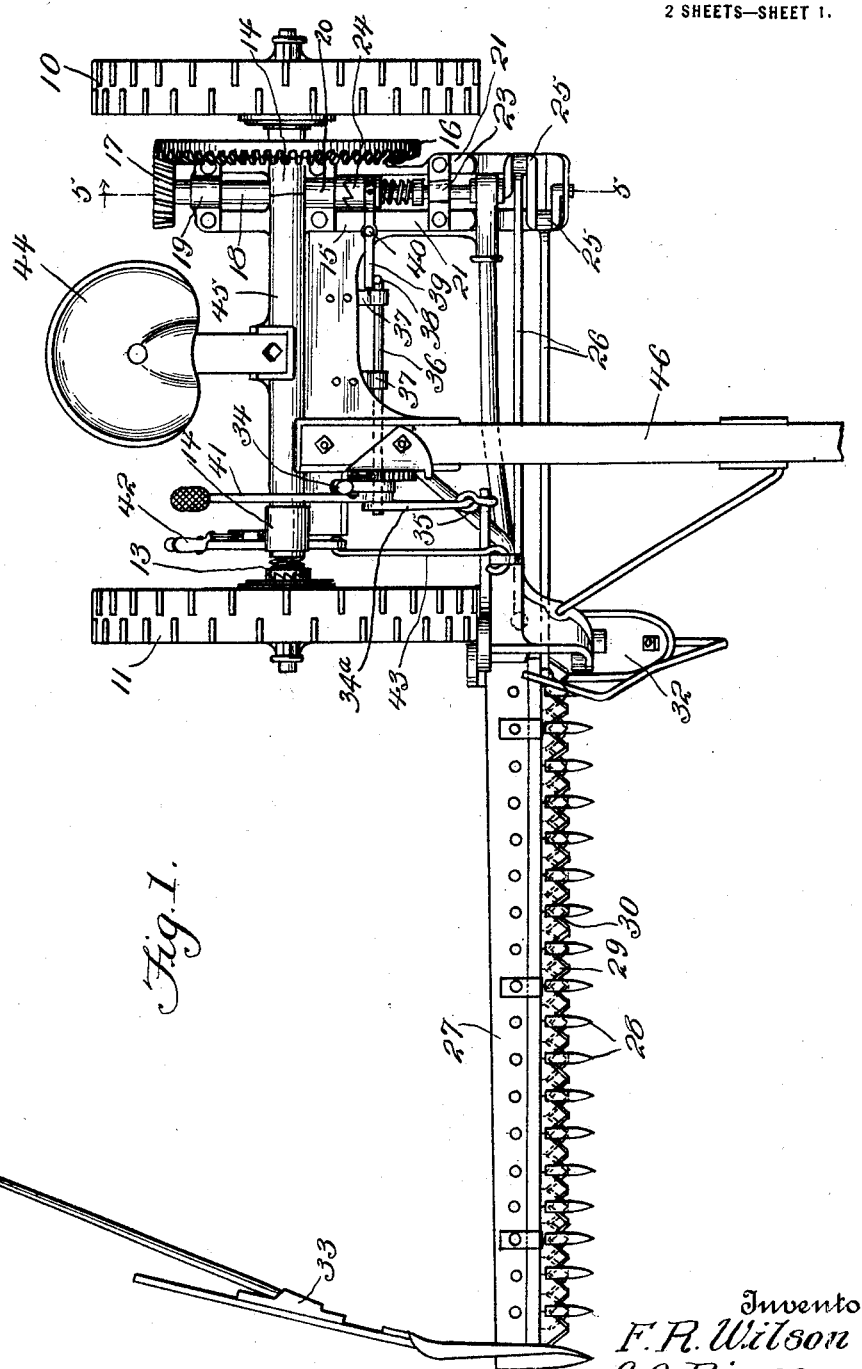
Figure 1 is a plan view of a mowing machine constructed in accordance with the present invention.

In the form of the invention illustrated there is employed the usual traction wheels 10 and 11, which are mounted upon an axle 12, the wheel 10 being fast upon the axle, while the wheel 11 is locked to the axle through the medium of a clutch 13, so as to release the said wheel when the machine is making a turn in order to compensate for the different speeds of the two wheels at this time, as is usual in machines of this character.

Surrounding the axle 12 adjacent the wheels are sleeves 14, one of which provides means for pivotally securing to the axle 12 a frame 15, the latter being adapted to support mechanism to be hereinafter described. Mounted fast upon the axle 12 is a beveled gear 16, which is adapted to engage and drive a pinion 17. This pinion is mounted upon a shaft 18 having bearings in the frame 15, the said bearings being indicated at 19 and 20. The frame 15 includes parallel bars 21, between which the shaft 18 is located, the said shaft being formed of sections, the outer section 22 of which enters the socket in the other section to provide a bearing, while the opposite end of the section 22 has a bearing in a cross bar 23 secured transversely of the bars 21. The two sections of the shaft 18 are normally locked together through the medium of a spring actuated clutch 24, which is operated to release the section 22 in a manner to be later described. The outer end of the section 22 of the shaft 18 is formed with oppositely disposed cranks 25, to which are connected one end of pitman rods 26.

The finger bar which is shown at 27 is pivotally mounted upon the machine in a manner to permit of its being elevated as is usual in machines of this character. This cutter bar is of knife formation and includes the guard fingers 28, which are slotted in the usual manner. These guard fingers, however, instead of receiving in the slots a single knife bar, receive upper and lower knife bars 29 and 30, which are connected to the opposite ends of the pitman 26 through universal joints 31. The finger bar 27 is also provided with the usual shoe 32 and has extending rearwardly from the opposite end the usual track cleaner 33. The finger bar 27 is elevated through the medium of a hand lever 34, which is connected to the inner end of the said finger bar by an arm 34ª and a link 35, the latter being fast upon a rock shaft 36. The lever 34 is also mounted upon the rock shaft 36, which operates in bearings 37, the end of the rock shaft opposite that to which the lever is secured being provided with a right angularly disposed extension 38. This extension is adapted to bear against one end of a lever 39, which is pivoted at 40, the opposite end of a lever engaging the clutch 24. By this means when the hand lever 34 is operated to elevate the finger bar 27, the shaft 36 will be rocked and through the engagement of the right angular extremity 38 of this shaft with the lever 39, the clutch 24 will be moved to release the section 22 of the shaft 18, so that operation of the knife bars will cease even though the machine continues to travel. A foot lever 41 is also mounted upon the shaft 36 within convenient reach of the driver so that the shaft 36 may be rocked and the finger bar may be temporarily elevated to pass obstructions.

As previously stated, the frame 15 is pivotally mounted beneath the axle 12 and in order to properly adjust this frame, there is provided a lever 42, which is connected to the forward end of the frame through the medium of a link 43, so that the height of the finger bar 27 may be adjusted by pivotally adjusting the frame to regulate the height at which the machine will cut. The seat 44 is mounted upon a sleeve 45, which is in turn mounted upon the axle 12, the draft pole 46 also being secured to this sleeve.

It is believed that from the foregoing description, the construction, operation and advantages of the invention will be apparent. Various changes may be made in the form, proportions and minor details of construction of the invention and the right is reserved to make such changes.

Having described the invention, what is claimed is:

A mowing machine comprising a frame, means for pivotally supporting said frame transversely beneath the axle of the machine, a cutter bar, a driving gear mounted upon the axle of the machine, mechanism including gear operated cranks supported in said frame for operating the cutter bar from the driving gear, a clutch included in said mechanism, a pivoted clutch lever and a rock shaft engageable with one end of the pivoted clutch lever for controlling the operation of the clutch lever to disconnect the gear operated cranks.

In testimony whereof we affix our signatures.

FRANK R. WILSON.
ANDREW O. RINGO.